United States Patent
Jeon

(10) Patent No.: US 10,752,259 B2
(45) Date of Patent: Aug. 25, 2020

(54) BACK WARNING APPARATUS, AND METHOD AND CONTROL SYSTEM THEREFOR

(71) Applicant: MANDO CORPORATION, Pyeongtaek-si, Gyeonggi-do (KR)

(72) Inventor: Kyung Geun Jeon, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/219,650

(22) Filed: Dec. 13, 2018

(65) Prior Publication Data

US 2020/0108841 A1   Apr. 9, 2020

(30) Foreign Application Priority Data

Oct. 8, 2018 (KR) .................... 10-2018-0120091

(51) Int. Cl.
*B60W 50/14* (2020.01)
*B60R 11/04* (2006.01)
(Continued)

(52) U.S. Cl.
CPC ............ *B60W 50/14* (2013.01); *B60R 11/04* (2013.01); *B60W 40/06* (2013.01); *G06T 7/55* (2017.01);
(Continued)

(58) Field of Classification Search
CPC .. B60W 50/14; B60W 40/06; B60W 2550/10; G06T 2207/30261; G06T 7/00;
(Continued)

(56) References Cited

U.S. PATENT DOCUMENTS 7,741,961 B1 * 6/2010 Rafii .................... B60Q 9/005
340/435
2017/0248694 A1 * 8/2017 Rosenblum ........... G01S 13/931
(Continued)

FOREIGN PATENT DOCUMENTS

| JP | 4741847 B2 | 8/2011 |
| JP | 2012-065225 A | 3/2012 |
| KR | 10-1417110 B1 | 7/2014 |

*Primary Examiner* — Hai Phan
*Assistant Examiner* — Anthony D Afrifa-Kyei
(74) *Attorney, Agent, or Firm* — Morgan, Lewis & Bockius LLP

(57) ABSTRACT

Provided is a back warning apparatus and a method and control system therefor. The back warning apparatus includes an image sensor installed at a rear of a vehicle, and a controller that obtains a rearview image via the image sensor when the vehicle moves rearward, recognizes the boundary of a free space in the rearview image and generates a surface profile associated with the height/depth of a surface behind the vehicle, determines the attribute of a rear object based on the boundary of the free space and the surface profile, and outputs a warning by determining whether a hazard exists in association with the attribute of the rear object based on the information associated with the vehicle. According to the present disclosure, information associated with a rear object having a short height is provided, thereby making effective use of a parking space and preventing damage to the bodywork of the vehicle.

18 Claims, 10 Drawing Sheets

(51) Int. Cl.
*G06T 7/55* (2017.01)
*B60W 40/06* (2012.01)

(52) U.S. Cl.
CPC .............. *B60W 2554/00* (2020.02); *G06T 2207/30261* (2013.01)

(58) Field of Classification Search
CPC . G06T 7/55; G06T 7/215; B60R 11/04; G01S 13/931; G01S 13/86; G01S 13/867; G01S 13/426; G01S 13/87; G01S 2013/9342; G01S 2013/9346; G01S 2013/935; G01S 2013/9357; G01S 2013/9382; G06K 9/00791
See application file for complete search history.

(56) References Cited

U.S. PATENT DOCUMENTS

| | | | |
|---|---|---|---|
| 2017/0320437 A1* | 11/2017 | Liebau | G01C 11/02 |
| 2018/0101739 A1* | 4/2018 | Zhang | G06K 9/00805 |
| 2018/0268229 A1* | 9/2018 | Nakata | G06T 7/593 |
| 2019/0077332 A9* | 3/2019 | Rotzer | B60R 11/04 |

* cited by examiner

BACK WARNING APPARATUS, AND METHOD AND CONTROL SYSTEM THEREFOR

CROSS REFERENCE TO RELATED APPLICATION

This application claims priority from Korean Patent Application No. 10-2018-0120091, filed on Oct. 8, 2018, which is hereby incorporated by reference for all purposes as if fully set forth herein.

BACKGROUND OF THE INVENTION

1. Field of the Invention

The present disclosure relates to a back warning apparatus and a method and control system therefor, which may provide a warning using an image obtained via a rear camera of a vehicle.

2. Description of the Prior Art

A vehicle is equipped with devices that provide information associated with the rear of the vehicle where the field of view of a driver does not reach. For example, an alarm device, a parking aid device, or the like is installed at the vehicle. When the vehicle moves rearward, the alarm device determines a situation associated with a collision with a rear object, using a sensor installed at the rear side of the vehicle, such as an ultrasonic sensor, a radar sensor, or the like, and provides a warning to a driver. The parking aid device displays a rearview image using a rear camera.

The alarm device or the parking aid device provides a warning associated with a rear object, so as to provide convenience to a driver. However, in association with a topographical level which is lower than the ground such as a depression of a drain or a road, or an object of which the height is short, such as the curb mounted on a road, the alarm device or the parking aid device may have difficulty in providing a warning.

Therefore, there is a desire for a method of recognizing a topographical level which is lower than the ground existing behind a vehicle or an object having a relatively short height, and informing the driver of the same, while a driver moves rearward the vehicle.

SUMMARY OF THE INVENTION

In this background, an aspect of the present disclosure is to provide a back warning apparatus and a method and a control system therefor, which may determine the attribute of a rear object based on a free space recognized from a rearview image of a vehicle and based on a surface profile, and may output a warning associated with whether a hazard exists which is determined based on the information associated with the vehicle and the attribute of the rear object, whereby information associated with the rear object having a relatively short height may be provided.

Another aspect of the present disclosure is to provide a back warning apparatus and a method and control system therefor, which may differentially output a wailing based on the height to the bodywork of a vehicle and the height of a rear object, thereby making effective use of a parking space and preventing damage to the bodywork when the vehicle moves rearward.

In accordance with an aspect of the present disclosure, there is provided a back warning apparatus, the apparatus including: an image sensor mounted to a vehicle and configured to capture image data behind the vehicle; an image processor configured to process image data captured by the image sensor; at least one sensor configured to obtain information associated with the vehicle; and a controller comprising a non-transitory memory and a processor, and configured to output a back warning based on processing of the image data. The controller is configured to perform: obtaining a rearview image based on processing of the image data when the vehicle moves rearward; recognizing a boundary of a free space in the rearview image, and generating a surface profile associated with a height/depth of a surface behind the vehicle; determining an attribute of a rear object based on the boundary of the free space and the surface profile, and determining whether a hazard exists in association with the attribute of the rear object, based on the information associated with the vehicle, and outputting a warning.

In accordance with another aspect of the present disclosure, there is provided a back warning apparatus, the apparatus including: an image sensor mounted to a vehicle and configured to capture image data behind the vehicle; and a controller configured to process image data captured by the image sensor, and to control at least one driver assistance system installed in the vehicle. The domain control unit is configured to perform: obtaining a rearview image based on processing of the image data; recognizing a boundary of a free space in the rearview image and generating a surface profile associated with a height/depth of a surface; determining an attribute of a rear object based on the boundary of the free space and the surface profile; and determining whether a hazard exists in association with the attribute of the rear object, based on the information associated with the vehicle, and if a hazard is detected, outputting a different warning based the determined attribute.

In accordance with another aspect of the present disclosure, there is provided an image sensor disposed in a vehicle so as to have a field of view behind the vehicle, and configured to capture image data, wherein the image data is processed by a processor, is used for obtaining a rearview image when the vehicle moves rearward, and is used for recognizing a boundary of a free space in the rearview image and generating a surface profile associated with a height/depth of a surface, and the boundary of the free space and the surface profile is used for determining an attribute of a rear object, and for determining whether a hazard exists in association with the attribute of the rear object based on the information associated with the vehicle.

In accordance with another aspect of the present disclosure, there is provided a back warning method by a vehicle, the method including: obtaining a rearview image via an image sensor installed at a rear of the vehicle when the vehicle moves rearward; recognizing a boundary of a free space in the rearview image and generating a surface profile associated with a height/depth of a surface behind the vehicle; determining an attribute of a rear object based on the boundary of the free space and the surface profile; and determining whether a hazard exists in association with the attribute of the rear object based on the information associated with the vehicle, and outputting a warning.

In accordance with another aspect of the present disclosure, there is provided a control system, the system including: a back warning apparatus configured to obtain a rearview image via an image sensor installed at the rear side of a vehicle when the vehicle moves rearward, to recognize a boundary of a free space in the rearview image and to generate a surface profile associated with a height/depth of a surface behind the vehicle, to determine an attribute of a rear object based on the boundary of the free space and the surface profile, and to output a warning by determining whether a hazard exists in association with the attribute of the rear object, based on the information associated with the vehicle; and an electronic control unit configured to control the vehicle based on whether the hazard exists, which is determined by the back warning apparatus.

As described above, according to the present disclosure, a back warning apparatus and a method and control system therefor may be provided, which may determine the attribute of a rear object based on a free space recognized from a rearview image of a vehicle and based on a surface profile, and may output a warning associated with whether a hazard exists which is determined based on the information associated with the vehicle and the rear object, whereby information associated with the rear object having a relatively short height may be provided. Conventionally, it was difficult to provide a warning associated with the rear object having a relatively short height.

Also, a back warning apparatus and a method and control system therefor may differentially output a warning based on the height to the bodywork of a vehicle and the height of a rear object, thereby making effective use of a parking space and preventing damage to the bodywork, as the vehicle moves rearward.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
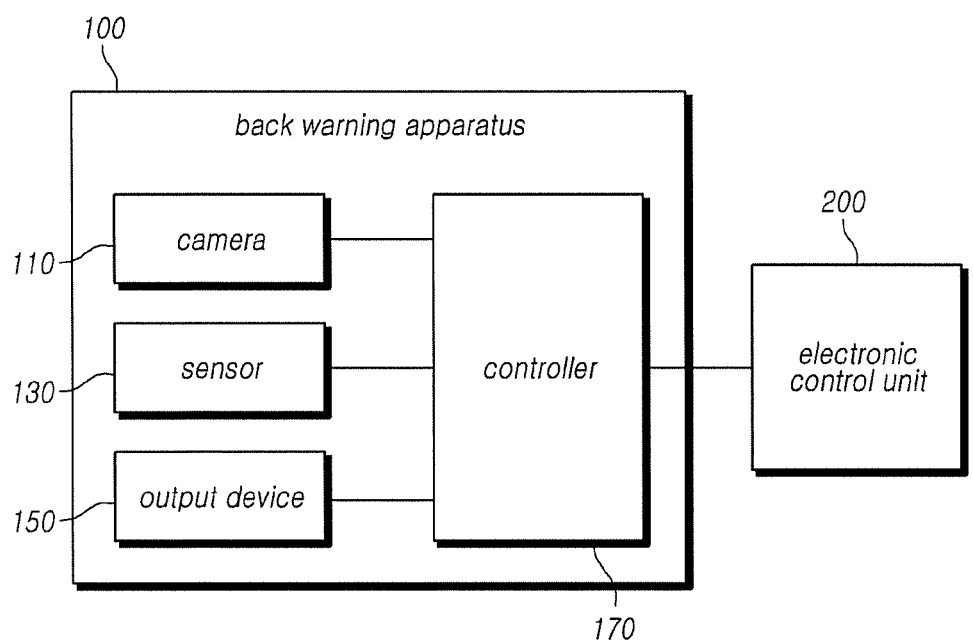
FIG. 1 is a block diagram of a control system including a back warning apparatus according to the present disclosure.

Hereinafter, embodiments of the present disclosure will be described in detail with reference to the accompanying drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Unless defined otherwise, all terms as used herein (including technical terms and scientific terms) have the same meaning as commonly understood by a person of ordinary skill in the art to which the present disclosure pertains. Such terms as those defined in a generally used dictionary are not to be interpreted to have ideal or excessively meanings unless clearly defined in the present disclosure. The terms as described below are defined in consideration of the functions of the present disclosure, but the meaning of the terms may be changed according to a user, intention of an operator, or convention. Therefore, the definitions of the terms should be made based on the contents throughout the specification.

In the present disclosure, "when a vehicle moves rearward" indicates the case in which a vehicle actually moves rearward or the case in which a signal for reversing a vehicle is sensed. Also, "free space" indicates an area where a vehicle can drive based on the current position of the vehicle. Also, "surface profile" indicates information associated with the height/depth (the relative height) of a surface behind the vehicle in the sectional view, which is shown from the side. It is understood that a vehicle may move rearward, for example, on a paved street or a parking lot which may or may not be paved. Thus, for the purposes of this application, unless explicitly specified otherwise, the term "road" refers to a surface that may or may not be paved. Also, "the attribute of a rear object" indicates information associated with the type, the position, or the depth of an object, such as an obstacle (e.g., curb), a depressed area, or the like which exists behind a vehicle.

Hereinafter, a back warning apparatus and a method and control system therefor according to embodiments of the present disclosure will be described with reference to attached drawings.

FIG. 1 is a block diagram of a control system including a back warning apparatus according to the present disclosure. FIGS. 2 to 7 are diagrams illustrating the operation of a back warning apparatus according to the present disclosure.

Referring to FIG. 1, a control system 10 according to the present disclosure includes: a back warning apparatus 100, which obtains a rearview image via a camera installed at the rear side of a vehicle when the vehicle moves rearward, recognizes the boundary of a free space from the rearview image and generates a surface profile associated with the height/depth of a road, determines the attribute of a rear object based on the boundary of the free space and the surface profile, and outputs a warning by determining whether a hazard exists in association with the attribute of the rear object, based on the information associated with the vehicle; and an electronic control unit (ECU) 200, which controls the vehicle based on whether a hazard exists which is determined by the back warning apparatus 100.

The control system 10 may determine whether a hazard exists which is attributable to an object existing behind the vehicle, based on information obtained from a camera 110 and a sensor 130. The control system 10 may output a warning via an output device 150 based on the determination on whether the hazard exists. Also, the control system 10 may control or stop reversing the vehicle via the electronic control unit 200, based on the determination on whether the hazard exists.

The back warning apparatus 100 included in the control system 10 may include: the camera 110 installed at the rear side of the vehicle; at least one sensor 130 configured to obtain the information associated with the vehicle; the output device 150 configured to output a warning according to the control of a controller; and a controller 170 that obtains a rearview image via the camera when the vehicle moves rearward, recognizes the boundary of a free space from the rearview image and generates a rod profile associated with the height/depth of a road, determines the attribute of a rear object based on the boundary of the free space and the surface profile, and controls the output device 150 so as to output a warning by determining whether a hazard exists in association with the attribute of the rear object, based on the information associated with the vehicle.

According to an embodiment, the camera 110 may include an image sensor that is disposed in the vehicle to have a field of view behind a vehicle and is configured to capture image data, and a processor configured to process image data captured by the image sensor. According to an embodiment, the image sensor and the processor may be implemented as a single module.

The image sensor may be disposed in the vehicle to have a field of view with respect to the outside of the autonomous vehicle. At least one image sensor may be installed in each part of the vehicle so as to have a field of view ahead of the vehicle, a field of view corresponding to a lateral side of the vehicle, or a field of view behind the vehicle.

Image information obtained via photographing by the image sensor is configured as image data, and thus, the image information may refer to the image data captured by the image sensor. Hereinafter, in the present disclosure, the image information obtained via photographing by the image sensor may indicate image data captured by the image sensor. The image data captured by the image sensor may be generated in one of the formats, for example, Raw AVI, MPEG-4, H.264, DivX, and JPEG. The image data captured by the image sensor may be processed by the processor.

Also, the image sensor may be disposed in the vehicle so as to have a field of view behind the vehicle, and is configured to capture image data. The image data captured by the image sensor may be processed by the processor, and may be used for obtaining a rearview image when the vehicle moves rearward, and may be used for recognizing the boundary of a free space from the rearview image and generating a surface profile associated with the height/depth of a road. The boundary of the free space and the surface profile may be used for determining the attribute of a rear object, and may be used for determining whether a hazard exists in association with the attribute of the rear object, based on the information associated with the vehicle.

The processor may operate so as to process image data captured by the image sensor. For example, at least a part of an operation of obtaining a rearview image and obtaining the boundary of a free space and a surface profile may be performed by the processor.

The processor may be implemented using at least one of the electrical units which are capable of processing image data and performing other functions, for example, application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and the like.

Figure 2:
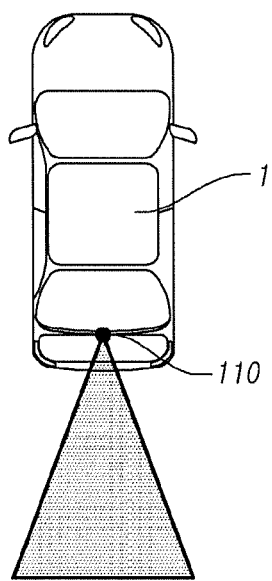
FIGS. 2 to 7 are diagrams illustrating the operation of a back warning apparatus according to the present disclosure.

As illustrated in FIG. 2, the camera 110 may be installed at the rear side of the vehicle 1 in which the control system 10 is installed. According to an embodiment, although FIG. 2 illustrates that a single camera is disposed, this is not limited thereto. According to an embodiment, the camera 110 may be implemented as a plurality of cameras having a field of view behind the vehicle 1. In this instance, the controller 170 may obtain an image by combining images obtained from the cameras.

The sensor 130 is installed in the vehicle 1 and may obtain various pieces of information associated with the vehicle 1. The information associated with the vehicle obtained from the sensor 130 may include information associated with the height to the bodywork of the vehicle 1, the position of a rear wheel, the position of a rearmost section of the vehicle, and the like. In order to obtain the information associated with the vehicle from the sensor 130, the back warning apparatus 100 may further include a memory (not illustrated) for storing information associated with the data of the vehicle 1.

According to an embodiment, the sensor 130 may obtain information associated with the height to the bodywork of the vehicle 1, the position of a rear wheel, the position of the rearmost section of the vehicle, and the like, using information associated with the data of the vehicle 1 and the information associated with the current state of the vehicle 1. Any sensor that is capable of obtaining required information associated with a vehicle may be used as the sensor 130, irrespective of the type of sensor.

The output device 150 may output a warning corresponding to the determination made by the controller 170 on whether a hazard exists, which is attributable to an object behind the vehicle, according to the control of the controller 170. The output device 150 may output a visual, audible, or tactile warning. According to an embodiment, the output device 150 may include a display for outputting a visual warning, a speaker for outputting an acoustic warning, and a steering wheel in which a haptic module is installed so as to output a tactile warning.

The controller 170 may control the operation of the back waiving apparatus 100. According to an embodiment, the controller 170 may be implemented as an electronic control unit (ECU). The controller 170 may receive a result of processing image data from the processor. The controller 170 may perform back warning based on processing of image data.

The controller 170 may obtain a rearview image via the camera 110 when the vehicle 1 moves rearward. According to an embodiment, when a signal for reversing the vehicle is sensed, the controller 170 may operate the camera 110 installed at the rear side. For example, the signal for reversing the vehicle may indicate the case in which the vehicle 1 is switched to a reverse mode. The controller 170 may obtain a rearview image via the camera 110 when the vehicle 1 moves rearward.

The controller 170 may recognize the boundary of a free space where the vehicle 1 is capable of driving, from the obtained rearview image. The controller 170 may recognize the free space by applying an object detection algorithm to the rearview image obtained via the camera 110. The algorithm that detects the free space from the image is based on the publicly known method. The method is not limited to a predetermined algorithm, and any method that is capable of recognizing a free space may be used.

Figure 3:
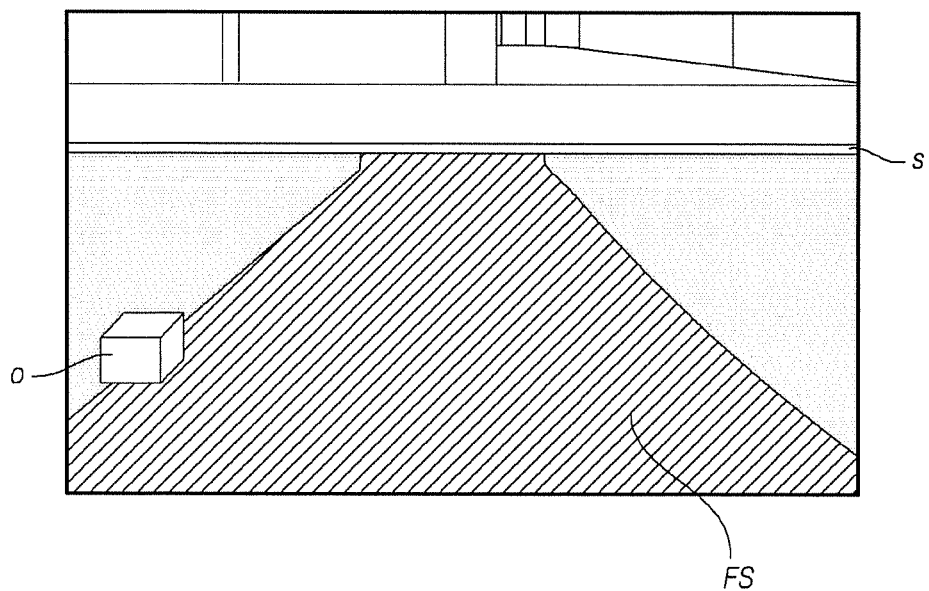
Figure 4:
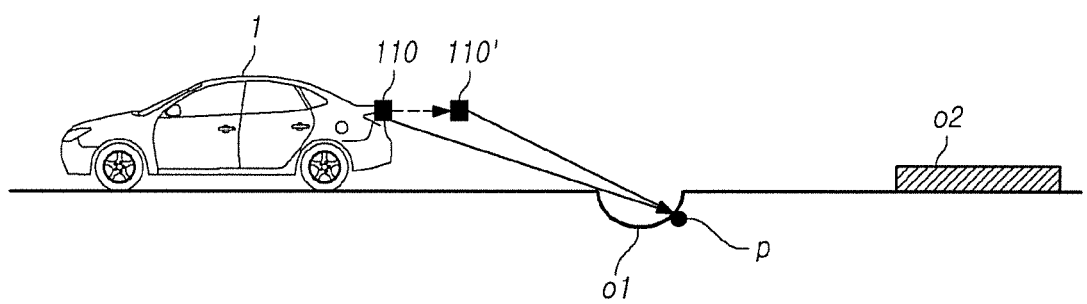

Referring to FIG. 3, a free space recognized from an image obtained from the camera 110 is illustrated. In the corresponding image, buildings and a sidewalk distinguished by curb (s) are illustrated in the upper portion. In the portion under the curb (s), a free space (FS) that excludes a predetermined obstacle (o) or a no vehicle area, and allows the vehicle 1 to drive may be displayed in the manner that distinguishes the free space from other areas.

The controller 170 may generate a surface profile associated with the height/depth of a road from the obtained rearview image. According to an embodiment, the surface profile may be generated in association with the free space, based on the recognized boundary of the free space.

In order to generate the surface profile, the controller 170 may obtain a change in the slope recognized from a predetermined point in front of the camera 110, as the vehicle 1 moves, and may determine the height of the corresponding point. For example, referring to FIG. 4, a depression topography (o1) and curb (o2) are illustrated as rear objects of the vehicle 1. As the vehicle 1 moves rearward, the position of the camera 110 is changed. An image including a predetermined point (p) may be obtained from each position 110 and 110'. The controller 170 may determine the height/depth of the predetermined point (p) based on a change in the slope recognized from a predetermined point (p) in the image obtained from each position.

The controller 170 may determine the attribute of the rear object based on the boundary of the free space and the surface profile. The attribute of the rear object may include information associated with the type, the position, or the depth of an object, such as an obstacle (e.g., curb), a depressed area, or the like which exists behind the vehicle. For example, the controller 170 may determine an area of which the height is lower than the other areas in the free space as a depressed area, and may obtain information associated with the position, the area, and the depth of the corresponding area. Alternatively, the controller 170 may determine an area of which the height is higher than the other areas at the boundary of the free space as curb, and may obtain information associated with the position, the height, of the like of the area.

Figure 5:
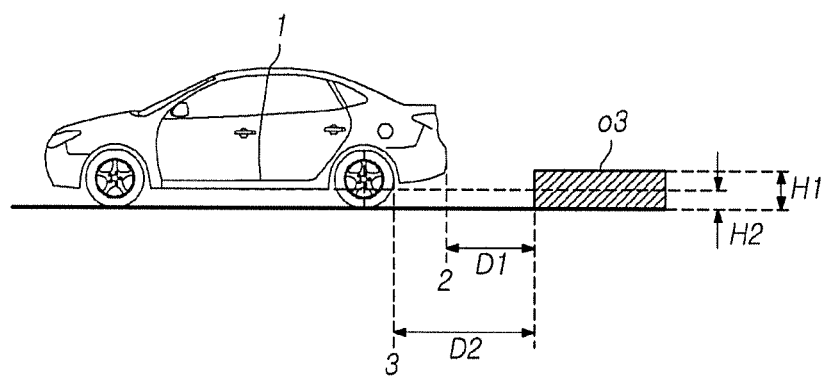

The controller 170 may determine whether a hazard exists in association with the attribute of the rear object, based on the information associated with the vehicle obtained from the sensor 130. Referring to FIG. 5, the controller 170 may calculate the position and the height/depth of a rear object (o3) based on a part of the vehicle 1, using the boundary of a free space and a surface profile.

Figure 6:
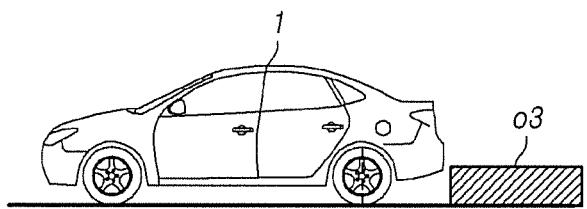

According to an embodiment, when the height (H1) of a rear object is higher than the height (H2) to the bodywork of the vehicle 1, the controller 170 may calculate the distance (D1) to the rear object (o3) based on the rearmost section 2 of the vehicle 1. When the distance (D1) to the rear object (o3) becomes shorter than a predetermined dangerous distance, as the vehicle 1 moves rearward, the controller 170 may output a warning. That is, as illustrated in FIG. 6, when the height of the object (o3) is higher than the bodywork of the vehicle 1, a driver may receive a warning, and may safely reverse the vehicle 1 within the scope in which the rearmost section of the vehicle does not pass the object (o3).

Figure 7:
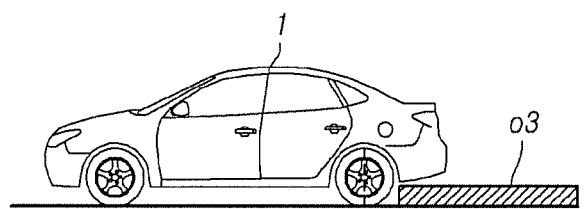

According to another embodiment, when the height (H1) of the rear object is lower than the height (H2) to the bodywork of the vehicle 1, the controller 170 may calculate the distance (D2) to the rear object (o3) based on the position of a rear wheel 3 of the vehicle 1. When the distance (D2) to the rear object (o3) becomes shorter than a predetermined dangerous distance, as the vehicle 1 moves rearward, the controller 170 may output a warning. That is, as illustrated in FIG. 7, when the height of the object (o3) is lower than the height to the bodywork of the vehicle 1, a driver may reverse the vehicle 1 within the scope in which the rear wheels of the vehicle do not meet the object (o3). Therefore, when compared to the case of FIG. 6, the driver may more effectively use a parking space.

According to another embodiment, it is assumed that the depth of a rear object is greater than the height (H2) to the bodywork of the vehicle 1. That is, when a depressed area of which the depth is greater than the height to the bodywork of the vehicle 1 exists behind the vehicle 1, the controller 170 may calculate the distance to the depressed area based on the position of the rear wheel 3 of the vehicle 1. When the distance to the rear object becomes shorter than a predetermined dangerous distance, as the vehicle 1 moves rearward, the controller 170 may output a warning.

In this instance, according to an embodiment, the controller 170 may calculate the diameter of the depressed area. When the diameter of the depressed area is narrower than the width of the rear wheel of the vehicle 1, the controller 170 may not output a warning, or may output a different warning.

According to an embodiment, when it is determined that reversing is dangerous (e.g., when the vehicle approaches the rear object at a distance closer than the predetermined dangerous distance), the controller 170 may output different warnings via the output device 150 based on the attribute of the rear object.

According to an embodiment, when the height (H1) of the rear object is higher than the height (H2) to the bodywork of the vehicle 1, the controller 170 may indicate a collision hazard associated with the rearmost section of the vehicle 1. For example, the controller 170 may display text, figures, or the like indicating the collision hazard associated with the rearmost section, on a display installed inside the vehicle. Alternatively, the controller 170 may output a voice warning of the collision hazard associated with the rearmost section, via a speaker. Alternatively, the controller 170 may output, to a steering wheel, a vibration of a first pattern that vibrates at regular intervals.

According to another embodiment, when the height (H1) of the rear object is lower than the height (H2) to the bodywork of the vehicle 1, the controller 170 may indicate a collision hazard associated with the rear wheel of the vehicle. For example, the controller 170 may display text, figures, or the like indicating the collision hazard associated with the rear wheel, on a display installed inside the vehicle. Alternatively, the controller 170 may output a voice warning of the collision hazard associated with the rear wheel, via a speaker. Alternatively, the controller 170 may output, to a steering wheel, a vibration of a second pattern that vibrates at regular intervals which are different from those of the first pattern.

According to another embodiment, when the depth of a rear object is greater than the height to the bodywork of the vehicle 1, the controller 170 may indicate a hazard in which the rear wheel of the vehicle falls into a depressed area. For example, the controller 170 may display text, figures, or the like indicating the fall hazard associated with the rear wheel, on a display installed inside the vehicle. Alternatively, the controller 170 may output a voice warning of the fall hazard associated with the rear wheel, via a speaker. Alternatively, the controller 170 may output, to a steering wheel, a vibration of a third pattern that vibrates at regular intervals which are different from those of the first and second patterns.

In this instance, when the diameter of the depressed area is narrower than the width of the rear wheel of the vehicle 1, the controller 170 may output a warning associated with an impact that may occur as the rear wheel passes the depressed area.

According to the above-description, the attribute of the rear object is determined based on the free space and the surface profile recognized from the rearview image of the vehicle, and a warning is output in association with whether a hazard exists, which is determined based on the information associated with the vehicle and the attribute of the rear object. Accordingly, information associated with the rear object having a relatively short height may be provided. Also, different warnings are output based on the height to the bodywork of the vehicle and the height of the rear object, thereby making effective use of a parking space and preventing damage to the bodywork when a driver moves rearward the vehicle to park it.

The back warning apparatus 100 according to the present disclosure may include: an image sensor disposed in the vehicle to have a field of view behind the vehicle, and configured to capture image data; at least one sensor configured to obtain information associated with the vehicle; and a domain control unit (DCU) that is configured to perform: processing image data captured by the image sensor, and controlling at least one driver assistance system installed in the vehicle.

According to an embodiment, the processor for processing image data, the controller, the electronic control unit, and the like which have been described above may be integrated and implemented as a domain control unit. In this instance, the domain control unit may generate various vehicle control signals, and may control a driving assistance system installed in the vehicle and various relevant devices of the vehicle.

The domain control unit may obtain a rearview image based on processing of image data when the vehicle moves rearward, may recognize the boundary of a free space from the rearview image and may generate a surface profile associated with the height/depth of a road, may determine the attribute of a rear object based on the boundary of the free space and the surface profile, and may output a warning by determining whether a hazard exists in association with the attribute of the rear object, based on the information associated with the vehicle. To this end, the domain control unit may include at least one processor.

The domain control unit is installed in the vehicle, and may communicate with at least one image sensor and at least one non-image sensor installed in the vehicle. To this end, a suitable data link or a communication link for data transmission or signal communication, such as a vehicle network bus or the like, may be further included.

The domain control unit may operate to control one or more from among various driver assistance systems (DAS) used for the vehicle. The domain control unit may control a driver assistance system (DAS) such as, a blind spot detection (BSD) system, an adaptive cruise control (ACC) system, a lane departure warning system (LDWS), a lane-keeping assistance system (LKAS), a lane change assistance system (LCAS), or the like, based on the sensing data captured by a plurality of non-image sensors and image data captured by an image sensor.

The domain control unit may obtain a rearview image by processing image data captured by the image sensor when the vehicle 1 moves rearward. According to an embodiment, the domain control unit may operate the image sensor installed at the rear side, when a signal for reversing the vehicle is sensed. For example, the signal for reversing the vehicle may indicate the case in which the vehicle 1 is switched to a reverse mode. The domain control unit may obtain a rearview image via the image sensor when the vehicle 1 moves rearward.

The domain control unit may recognize the boundary of a free space where the vehicle 1 is capable of driving, from the obtained rearview image. The domain control unit may recognize the free space by applying an object detection algorithm to the rearview image obtained via the camera 110. The algorithm that detects the free space from the image is based on the publicly known method. The method is not limited to a predetermined algorithm, and any method that is capable of recognizing a free space may be used.

The domain control unit may generate a surface profile associated with the height/depth of a road from the obtained rearview image. According to an embodiment, the surface profile may be generated in association with the free space, based on the recognized boundary of the free space.

In order to generate the surface profile, the domain control unit may obtain a change in the slope recognized from a predetermined point in front of the camera 110, as the vehicle 1 moves, and may determine the height of the corresponding point. The domain control unit may determine the height/depth of a predetermined point using a change in the slope recognized from a predetermined point in an image obtained from each position.

The domain control unit may determine the attribute of a rear object based on the boundary of the free space and the surface profile. The attribute of the rear object may include information associated with the type, the position, or the depth of an object, such as an obstacle (e.g., curb), a depressed area, or the like which exists behind the vehicle. For example, the domain control unit may determine an area of which the height is lower than the other areas in the free space as a depressed area, and may obtain information associated with the position, the area, and the depth of the corresponding area. Alternatively, the domain control unit may determine an area of which the height is higher than the other areas at the boundary of the free space as a curb, and may obtain information associated with the position, the height, of the like of the area.

The domain control unit may determine whether a hazard exists in association with the attribute of the rear object, based on the information associated with the vehicle obtained from the sensor 130. Referring to FIG. 5, the domain control unit may calculate the position and the height/depth of the rear object (o3) based on a part of the vehicle 1, using the boundary of the free space and the surface profile.

According to an embodiment, when the height (H1) of the rear object is higher than the height (H2) to the bodywork of the vehicle 1, the domain control unit may calculate the distance (D1) to the rear object (o3) based on the rearmost section 2 of the vehicle 1. When the distance (D1) to the rear object (o3) becomes shorter than a predetermined dangerous distance, as the vehicle 1 moves rearward, the domain control unit may output a warning. That is, as illustrated in FIG. 6, when the height of the object (o3) is higher than the height to the bodywork of the vehicle 1, a driver may receive a warning, and may safely reverse the vehicle 1 within the scope in which the rearmost section of the vehicle does not pass the object (o3).

According to another embodiment, when the height (H1) of the rear object is lower than the height (H2) to the bodywork of the vehicle 1, the domain control unit may calculate the distance (D2) to the rear object (o3) based on the position of the rear wheel 3 of the vehicle 1. When the distance (D2) to the rear object (o3) becomes shorter than a predetermined dangerous distance, as the vehicle 1 moves rearward, the domain control unit may output a warning. That is, as illustrated in FIG. 7, when the height of the object (o3) is lower than the height to the bodywork of the vehicle 1, a driver may reverse the vehicle 1 within the scope in which the rear wheel of the vehicle does not meet the object (o3). Therefore, when compared to the case of FIG. 6, the driver may more effectively use a parking space.

According to another embodiment, it is assumed that the depth of a rear object is greater than the height (H2) to the bodywork of the vehicle 1. That is, when a depressed area of which the depth is greater than the height to the bodywork of the vehicle 1 exists behind the vehicle 1, the domain control unit may calculate the distance to the depressed area based on the position of the rear wheel 3 of the vehicle 1. When the distance to the depressed area becomes shorter than a predetermined dangerous distance, as the vehicle 1 moves rearward, the domain control unit may output a warning.

In this instance, according to an embodiment, the domain control unit may calculate the diameter of the depressed area. When the diameter of the depressed area is narrower than the width of the rear wheel of the vehicle 1, the domain control unit may not output a warning, or may output a different warning.

According to an embodiment, when it is determined that reversing is dangerous (e.g., when the vehicle approaches the rear object at a distance closer than the predetermined dangerous distance), the domain control unit may output different warnings via the output device 150 based on the attribute of the rear object.

According to an embodiment, when the height (H1) of the rear object is higher than the height (H2) to the bodywork of the vehicle 1, the domain control unit may indicate a collision hazard associated with the rearmost section of the vehicle. For example, the domain control unit may display text, figures, or the like indicating the collision hazard associated with the rearmost section, on a display installed inside the vehicle. Alternatively, the domain control unit may output a voice warning of the collision hazard associated with the rearmost section, via a speaker. Alternatively, the domain control unit may output, to a steering wheel, a vibration of a first pattern that vibrates at regular intervals.

According to another embodiment, when the height (H1) of the rear object is lower than the height (H2) to the bodywork of the vehicle 1, the domain control unit may indicate a collision hazard associated with the rear wheel of the vehicle. For example, the domain control unit may display text, figures, or the like indicating the collision hazard associated with the rear wheel, on a display installed inside the vehicle. Alternatively, the domain control unit may output a voice warning of the collision hazard associated with the rear wheel, via a speaker. Alternatively, the domain control unit may output, to a steering wheel, a vibration of a second pattern that vibrates at regular intervals which are different from those of the first pattern.

According to another embodiment, when the depth of a rear object is greater than the height to the bodywork of the vehicle 1, the domain control unit may indicate a hazard in which the rear wheel of the vehicle falls into a depressed area. For example, the domain control unit may display text, figures, or the like indicating the fall hazard associated with the rear wheel, on a display installed inside the vehicle. Alternatively, the domain control unit may output a voice warning of the fall hazard associated with the rear wheel, via a speaker. Alternatively, the domain control unit may output, to a steering wheel, a vibration of a third pattern that vibrates at regular intervals which are different from those of the first and second patterns.

In this instance, when the diameter of the depressed area is narrower than the width of the rear wheel of the vehicle 1, the domain control unit may output a warning associated with an impact that may occur as the rear wheel passes the depressed area.

According to the above-description, the attribute of the rear object is determined based on the free space and the surface profile recognized from the rearview image of the vehicle, and a warning is output in association with whether a hazard exists, which is determined based on the information associated with the vehicle and the attribute of the rear object. Accordingly, information associated with the rear object having a relatively short height may be provided. Also, different warnings are output based on the height to the bodywork of the vehicle and the height of the rear object, thereby making effective use of a parking space and preventing damage to the bodywork when a driver moves rearward the vehicle to park it.

Figure 8:
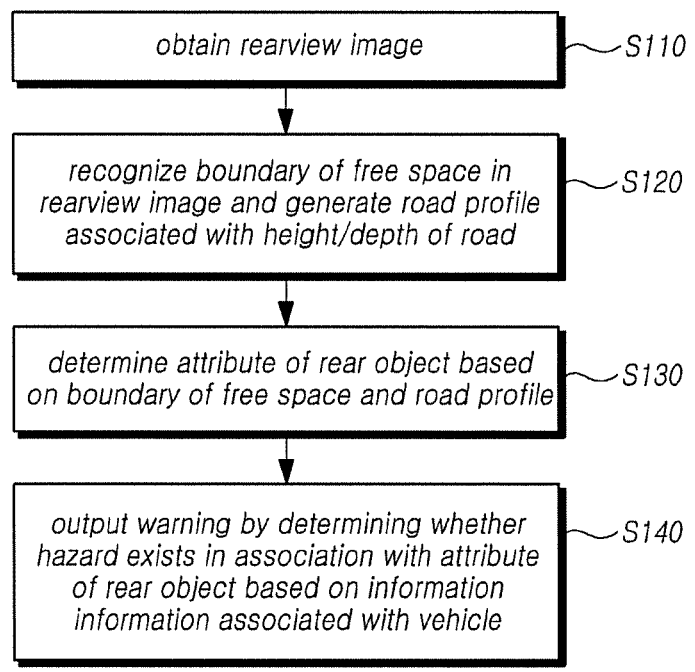
FIG. 8 is a flowchart illustrating a back warning method according to the present disclosure.
Figure 9:
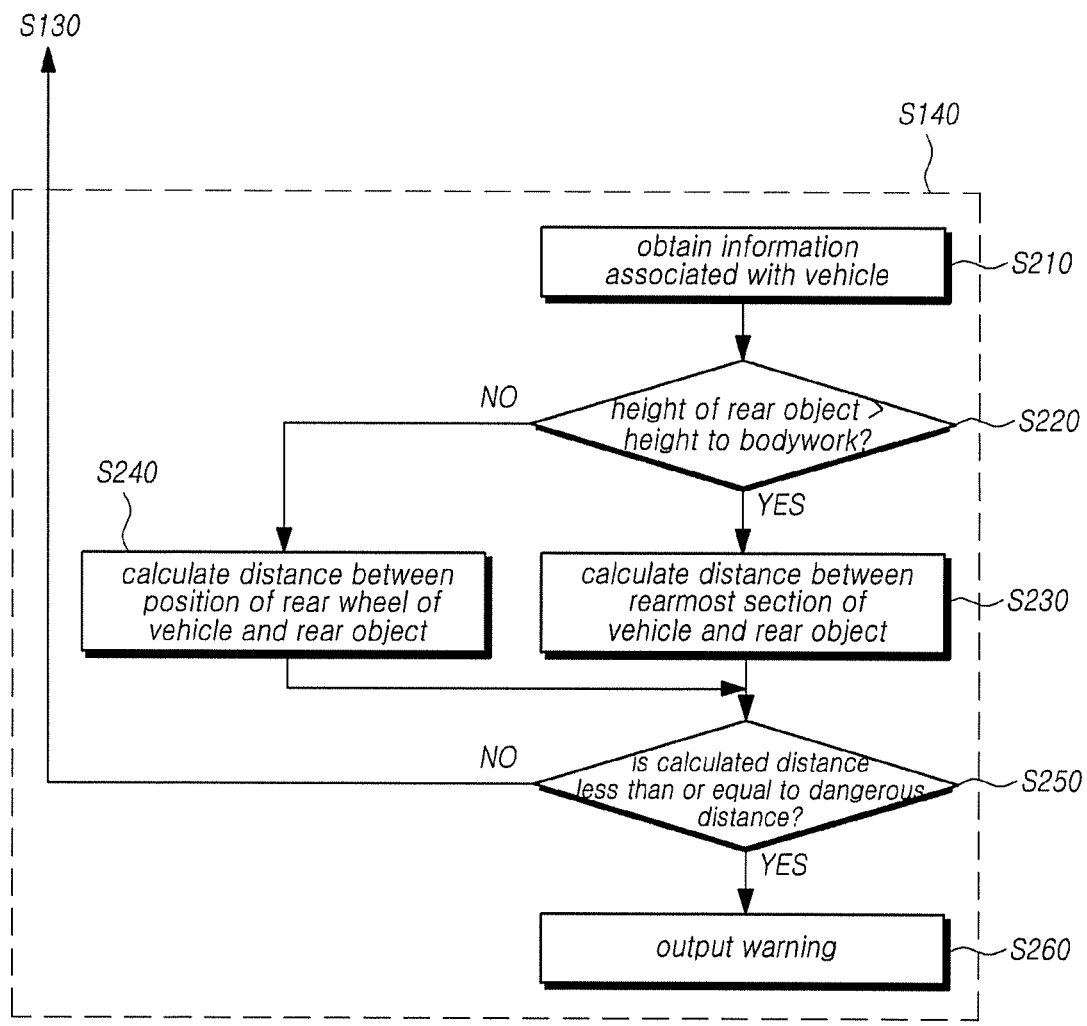
FIG. 9 is a flowchart illustrating a back warning method based on the height of a rear object according to the present disclosure.
Figure 10:
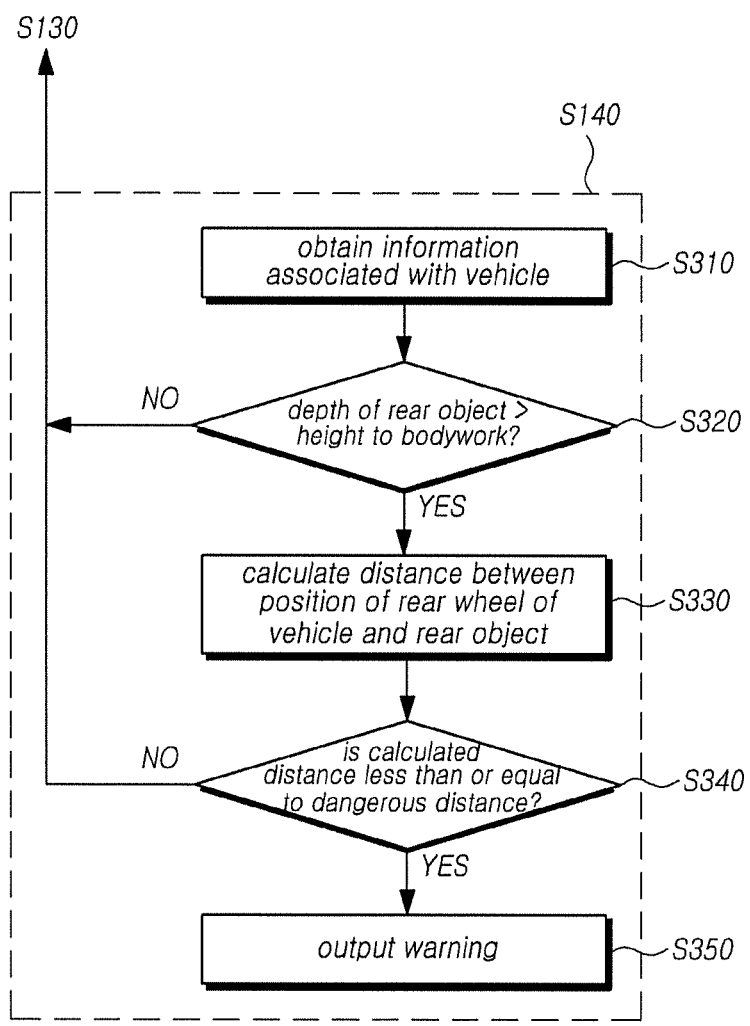
FIG. 10 is a flowchart illustrating a back warning method based on the depth of a rear object according to the present disclosure.

FIG. 8 is a flowchart illustrating a back warning method according to the present disclosure. FIG. 9 is a flowchart illustrating a back warning method based on the height of a rear object according to the present disclosure. FIG. 10 is a flowchart illustrating a back warning method based on the depth of a rear object according to the present disclosure.

The back warning method according to the present disclosure may be implemented by the back warning apparatus 100 which has been described with reference to FIG. 1. Hereinafter, the back warning method according to the present disclosure and the operation of the back warning apparatus 100 for implementing the back warning method will be described in detail with reference to drawings relevant thereto.

Referring to FIG. 8, the back warning apparatus obtains a rearview image via a camera installed at the rear side of a vehicle when the vehicle moves rearward in operation S110.

When the vehicle moves rearward, the back warning apparatus may obtain the rearview image via the camera. According to an embodiment, the back warning apparatus may operate the camera installed at the rear side, when a signal for reversing the vehicle is sensed. For example, the signal for reversing the vehicle may indicate the case in which the vehicle is switched to a reverse mode. When the vehicle moves rearward, the back warning apparatus may obtain a rearview image via the camera.

Referring again to FIG. 8, the back warning apparatus may recognize the boundary of a free space in the rearview image, and may generate a surface profile associated with the height/depth of a road in operation S120.

The back warning apparatus may recognize, from the obtained rearview image, the boundary of the free space where the vehicle is capable of driving. The back warning apparatus may recognize the free space by applying an object detection algorithm to the rearview image obtained via the camera. The algorithm that detects the free space from the image is based on the publicly known method. The method is not limited to a predetermined algorithm, and any method that is capable of recognizing a free space may be used.

The back warning apparatus may generate the surface profile associated with the height/depth of the road from the obtained rearview image. According to an embodiment, the surface profile may be generated in association with the free space, based on the recognized boundary of the free space. In order to generate the surface profile, the back warning apparatus may obtain a change in slope recognized from a predetermined point in front of the camera, as the vehicle moves, and may determine the height of the corresponding point.

In the above descriptions, the surface profile is generated after the free space is recognized. However, the order of the operations is not limited thereto. The back warning apparatus may be configured to recognize the free space from the obtained rearview image and to generate the surface profile at the substantially the same time.

Referring again to FIG. 8, the back warning apparatus may determine the attribute of a rear object based on the boundary of the free space and the surface profile in operation S130.

The back warning apparatus may determine the attribute of the rear object based on the boundary of the free space and the surface profile. The attribute of the rear object may include information associated with the type, the position, or the depth of an object, such as an obstacle (e.g., curb), a depressed area, or the like which exists behind the vehicle.

Referring again to FIG. 8, the back warning apparatus may output a warning by determining whether a hazard exists in association with the attribute of the rear object, based on the information associated with the vehicle, in operation S140.

The back warning apparatus may determine whether a hazard exists in association with the attribute of the rear object, based on the information associated with the vehicle obtained from a sensor installed in the vehicle. The back warning apparatus may calculate the position and the height/depth of the rear object based on a part of the vehicle, using the boundary of the free space and the surface profile.

The back warning apparatus may output a different warning which is distinguished based on the height/depth of the rear object, when the distance between the part of the vehicle and the rear object is less than or equal to a predetermined dangerous distance. Hereinafter, a process of outputting a warning will be described in detail with reference to FIGS. 9 and 10.

FIG. 9 is a flowchart illustrating operation S140 of FIG. 8 in detail. Referring to FIG. 9, the back warning apparatus may obtain information associated with the vehicle in operation S210. The back warning apparatus may obtain various pieces of information associated with the vehicle using various sensors installed at the vehicle. The information associated with the vehicle obtained from the sensor may include information associated with the height to the bodywork of the vehicle, the position of a rear wheel, the position of a rearmost section of the vehicle, and the like. In order to obtain the information associated with the vehicle from the sensor, the back warning apparatus may further include a memory for storing information associated with data of the vehicle.

The back warning apparatus may obtain information associated with the height to the bodywork of the vehicle, the position of the rear wheel, and the position of the rearmost section of the vehicle using the information associated with the data of the vehicle and the information associated with the current state of the vehicle. Any sensor that is capable of obtaining required information associated with the vehicle may be used as the sensor 130, irrespective of the type of sensor.

Referring again to FIG. 9, the back warning apparatus may compare the height of the rear object detected from the rearview image and the height to the bodywork of the vehicle in operation S220. When the height of the rear object is higher than the height to the bodywork of the vehicle in operation S220 (Yes), the back warning apparatus may calculate the distance to the rear object based on the area most section of the vehicle in operation S230.

The back warning apparatus may monitor whether the distance to the rear object becomes shorter than a predetermined dangerous distance, as the vehicle moves rearward in operation S250. When the distance to the rear object becomes shorter than the predetermined dangerous distance in operation S250 (yes) as the vehicle moves rearward, the back warning apparatus may output a warning in operation S260. In this instance, the back warning apparatus may display a collision hazard associated with the rearmost section of the vehicle.

For example, the back warning apparatus may display text, figures, or the like indicating the collision hazard associated with the rearmost section, on a display installed inside the vehicle. Alternatively, the back warning apparatus may output a voice warning of the collision hazard associated with the rearmost section, via a speaker. Alternatively, the back warning apparatus may output, to a steering wheel, a vibration of a first pattern that vibrates at regular intervals. Accordingly, when the height of the object is higher than the height to the bodywork of the vehicle, a driver may safely reverse the vehicle within the scope in which the rearmost section of the vehicle does not pass the object.

Referring again to FIG. 9, when the height of the rear object is lower than the height to the bodywork of the vehicle in operation S220 (No), the back warning apparatus may calculate the distance to the rear object based on the position of the rear wheel of the vehicle in operation S240. When the distance to the rear object becomes shorter than the predetermined dangerous distance in operation S250 (Yes) as the vehicle moves rearward, the back warning apparatus may output a warning in operation S260. In this instance, the back warning apparatus may display a collision hazard associated with the rear wheel of the vehicle.

For example, the back warning apparatus may display text, figures, or the like indicating the collision hazard associated with the rear wheel, on a display installed inside the vehicle. Alternatively, the back warning apparatus may output a voice warning of the collision hazard associated with the rear wheel, via a speaker. Alternatively, the back warning apparatus may output, to a steering wheel, a vibration of a second pattern that vibrates at regular intervals which are different from those of the first pattern. Accordingly, the vehicle is allowed to be parked in the state in which the rearmost section of the vehicle is placed above the rear object, and a driver may effectively use a parking space.

FIG. 10 is a flowchart illustrating operation S140 of FIG. 8 in detail according to another embodiment. Referring to FIG. 10, the back warning apparatus may obtain information associated with the vehicle in operation S310. This is substantially the same as operation S210 of FIG. 9 and thus, detailed descriptions thereof will be omitted.

Referring again to FIG. 10, the back warning apparatus may compare the height of the rear object detected from a rearview image and the height to the bodywork of the vehicle in operation S320. When the depth of the rear object is greater than the height to the bodywork of the vehicle in operation S320 (Yes), the back warning apparatus may calculate the distance to the rear object based on the position of the rear wheel of the vehicle in operation S330.

The back warning apparatus may monitor whether the distance to the rear object becomes shorter than a predetermined dangerous distance as the vehicle moves rearward in operation S340. When the distance to the rear object becomes shorter than the predetermined dangerous distance in operation S340 (yes) as the vehicle moves rearward, the back warning apparatus may output a warning in operation S350. In this instance, the back warning apparatus may display a collision hazard associated with the rear wheel of the vehicle.

For example, the back warning apparatus may display text, figures, or the like indicating a fall hazard associated with the rear wheel, on a display installed inside the vehicle. Alternatively, the back warning apparatus may output a voice warning of the fall hazard associated with the rear wheel, via a speaker. Alternatively, the back warning apparatus may output, to a steering wheel, a vibration of a third pattern that vibrates at regular intervals which are different from those of the first and second patterns.

When the diameter of a depressed area is narrower than the width of the rear wheel, the back warning apparatus may output a warning associated with an impact that may occur as the rear wheel passes the depressed area. Accordingly, when the depth of the object is greater than the height to the bodywork of the vehicle, a driver may safely reverse the vehicle within the scope in which the rear wheel of the vehicle does not pass the object.

According to the above-description, the attribute of the rear object is determined based on the free space and the surface profile recognized from the rearview image of the vehicle, and a warning is output in association with whether a hazard exists, which is determined based on the information associated with the vehicle and the attribute of the rear object. Accordingly, information associated with the rear object having a relatively short height may be provided. Also, different warnings are output based on the height to the bodywork of the vehicle and the height of a rear object, thereby making effective use of a parking space and preventing damage to the bodywork when a driver moves rearward the vehicle to park it.

The present disclosure, which has been described above, may be implemented by cords that a computer may read from a medium recording a program. A computer-readable recording medium includes all types of recording devices which store data readable by a computer system. The computer-readable recording medium includes, for example, a hard disk drive (HDD), a solid state disk (SSD), a silicon disk drive (SDD), a ROM, a RAM, a CD-ROM, a magnetic tape, a floppy disk, an optical data storage device, and the like, and also includes an implementation in the form of a carrier wave, (e.g., transmission via the Internet).

The above description and the accompanying drawings provide an example of the technical idea of the present disclosure for illustrative purposes only. Those having ordinary knowledge in the technical field, to which the present disclosure pertains, will appreciate that various modifications and changes in fault, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. A back warning apparatus, the apparatus comprising:
an image sensor mounted to a vehicle and configured to capture image data behind the vehicle;
an image processor configured to process image data captured by the image sensor;
a sensor configured to obtain information associated with the vehicle; and
a controller comprising a non-transitory memory and a processor, and configured to output a back warning based on processing of the image data,
wherein the controller is further configured to:
obtain a rearview image based on processing of the image data when the vehicle moves rearward;
recognize a boundary of a free space in the rearview image, and generate a surface profile associated with a height or depth of a surface behind the vehicle;
determine a position and height or depth of a rear object based on the boundary of the free space and the surface profile,
determine whether a hazard exists in association with an attribute of the rear object, based on the information associated with the vehicle,
output a warning dependent on the determined position and height or depth of the rear object, and
output, if a depth of the rear object is greater than a height to a bodywork of the vehicle, a warning based on a distance between a position of a rear wheel of the vehicle and the rear object.

2. The apparatus of claim 1, wherein the information associated with the vehicle comprises information associated with a height to a bodywork of the vehicle, a position of a rear wheel, a position of a rearmost section of the vehicle, and a position of a lowermost portion of the bodywork of the vehicle behind the rear wheel.

3. The apparatus of claim 1, wherein the controller is further configured to output, if the height of the rear object is higher than a height to a bodywork of the vehicle, a warning based on a distance between a rearmost section of the vehicle and the rear object.

4. The apparatus of claim 1, wherein the controller is further configured to output, if the height of the rear object is lower than a height to a bodywork of the vehicle, a warning based on a distance between a position of a rear wheel of the vehicle and the rear object.

5. The apparatus of claim 1, wherein the controller is further configured to output different warnings at different to times based on the position and height or depth of the rear object.

6. A back warning apparatus, the apparatus comprising:
an image sensor mounted to a vehicle and configured to capture image data behind the vehicle; and
a controller configured to process image data captured by the image sensor, and to control at least one driver assistance system installed in the vehicle;
wherein the controller is configured to:
obtain a rearview image based on processing of the image data when the vehicle moves rearward;
recognize a boundary of a free space in the rearview image and generate a surface profile associated with a height or depth of a surface behind the vehicle;
determine an attribute of a rear object based on the boundary of the free space and the surface profile;
determine whether a hazard exists in association with the attribute of the rear object, based on information associated with the vehicle,
output, if a hazard is detected, a warning, the warning being different depending on the determined attribute, and
determine a position and a height or depth of the rear object based on the boundary of the free space and the surface profile, and when a depth of the rear object is greater than a height to a bodywork of the vehicle, output a warning based on a distance between a position of a rear wheel of the vehicle and the rear object.

7. The apparatus of claim 6, wherein the information associated with the vehicle comprises information associated with a height to a bodywork of the vehicle, a position of a rear wheel, a position of a rearmost section of the vehicle, and a position of a lowermost portion of the bodywork of the vehicle behind the rear wheel.

8. The apparatus of claim 6, wherein the controller is further configured to determine a position and a height or depth of the rear object based on the boundary of the free space and the surface profile, and when the height of the rear object is higher than a height to a bodywork of the vehicle, output a warning based on a distance between a rearmost section of the vehicle and the rear object.

9. The apparatus of claim 6, wherein the controller is further configured to determine a position and a height or depth of the rear object based on the boundary of the free space and the surface profile, and when the height of the rear object is lower than a height to a bodywork of the vehicle, output a warning based on a distance between a position of a rear wheel of the vehicle and the rear object.

10. The back warning apparatus of claim 6, further comprising a sensor configured to obtain information associated with the vehicle.

11. A back warning method of a vehicle, the method comprising:
obtaining a rearview image via an image sensor installed at a rear of the vehicle when the vehicle moves rearward;
recognizing a boundary of a free space in the rearview image and generating a surface profile associated with a height/depth of a surface;
determining a position and height or depth of a rear object based on the boundary of the free space and the surface profile;
determining whether a hazard exists in association with the position and height or depth of the rear object based on information associated with the vehicle; and
outputting different warnings, the warnings being different based on position and height or depth of the rear object relative to a height of a bodywork of the vehicle and a position of a rear wheel of the vehicle relative to the rear object,
wherein, if a depth of the rear object is greater than a height to a bodywork of the vehicle, the outputting of the different warnings comprises outputting a warning based on a distance between a position of a rear wheel of the vehicle and the rear object.

12. The method of claim 11, wherein, if the height of the rear object is higher than a height to a bodywork of the vehicle, the outputting of the different warnings comprises:
outputting a warning based on a distance between a rearmost section of the vehicle and the rear object.

13. The method of claim 11, wherein, if the height of the rear object is lower than a height to a bodywork of the vehicle, the outputting of the different warnings comprises:
outputting a warning based on a distance between a position of a rear wheel of the vehicle and the rear object.

14. The method of claim 11, wherein the different warnings are outputted at different times.

15. A warning apparatus for a vehicle, the apparatus comprising:
an image sensor mounted to a vehicle and configured to capture image data in a field of view behind the vehicle;
an image processor configure to process the image data captured by the image sensor; and
a controller comprising a non-transitory memory and a processor, and configured to:
generate a surface profile of a surface behind the vehicle,
recognize an object on the surface behind the vehicle and recognize a boundary of a free space between the rearmost portion of the vehicle and the recognized object,
determine a height, depth or both of the object based on the recognized boundary and the surface profile, and
determine whether the height, depth or both of the object poses a hazard to the vehicle and determine the part of the vehicle to which the hazard is posed, output different warnings depending on the type of hazard being posed based on information associated with the vehicle,
wherein the different warnings includes a warning based on a distance between a position of a rear wheel of the vehicle and the rear object if a depth of the rear object is greater than a height to a bodywork of the vehicle.

16. The warning apparatus of claim 15, wherein a different warning is output depending on whether the height of the rear object is higher than a height to a bodywork of the vehicle, the height of the rear object is lower than a height to a bodywork of the vehicle, or a depth of the rear object is greater than a height to a bodywork of the vehicle.

17. The warning apparatus of claim 16, wherein the outputting of the different warnings is initiated at different times after detecting that the object poses a hazard.

18. The warning apparatus of claim 15, wherein the information associated with the vehicle comprises information associated with a height to a bodywork of the vehicle, a position of a rear wheel, a position of a rearmost section of the vehicle, and a position of a lowermost portion of the bodywork of the vehicle behind the rear wheel.

* * * * *